(12) United States Patent
Caradec et al.

(10) Patent No.: US 11,698,470 B2
(45) Date of Patent: Jul. 11, 2023

(54) BASEPLATE FOR SEISMIC VIBRATOR

(71) Applicant: SERCEL, Carquefou (FR)

(72) Inventors: Gilles Caradec, Cazere (FR); Germain Deborde, Carquefou (FR)

(73) Assignee: SERCEL, Carquefou (FR)

( * ) Notice: Subject to any disclaimer, the term of this patent is extended or adjusted under 35 U.S.C. 154(b) by 435 days.

(21) Appl. No.: 16/885,415

(22) Filed: May 28, 2020

(65) Prior Publication Data
US 2021/0373186 A1 Dec. 2, 2021

(51) Int. Cl.
*G01V 1/047* (2006.01)
(52) U.S. Cl.
CPC .................. *G01V 1/0475* (2013.01)
(58) Field of Classification Search
CPC .......... G01V 1/0475; G01V 1/155; G01V 2210/1295; G01V 1/143; G01V 1/047
See application file for complete search history.

(56) References Cited

U.S. PATENT DOCUMENTS

| | | |
|---|---|---|
| 4,253,538 A | 3/1981 | Weber et al. |
| 5,031,718 A | 7/1991 | Peavey |
| 6,612,396 B1 | 9/2003 | Chelminski et al. |
| 8,913,465 B2 | 12/2014 | Wei et al. |
| 9,217,799 B2 * | 12/2015 | Eick .................. G01V 1/155 |
| 2016/0170048 A1 * | 6/2016 | Eick .................. G01V 1/005 367/75 |
| 2021/0373186 A1 * | 12/2021 | Caradec ............... G01V 1/047 |

FOREIGN PATENT DOCUMENTS

| | | | |
|---|---|---|---|
| EP | 2363734 A1 * | 9/2011 | ............ G01V 1/047 |
| EP | 2363734 A1 | 9/2011 | |
| WO | 2018064153 A1 | 4/2018 | |
| WO | WO-2021240243 A1 * | 12/2021 | ........... G01V 1/0475 |

OTHER PUBLICATIONS

International Search Report / Written Opinion dated Sep. 6, 2021 in related/corresponding PCT Application No. PCT/IB2021/000364.

* cited by examiner

*Primary Examiner* — Daniel Pihulic
(74) *Attorney, Agent, or Firm* — Patent Portfolio Builders PLLC

(57) ABSTRACT

A vibratory source for generating seismic signals includes a baseplate, and a lift and hydraulic actuator system configured to actuate the baseplate to impart seismic waves into the ground. The baseplate includes plural individual plates for contacting the ground.

20 Claims, 11 Drawing Sheets

BASEPLATE FOR SEISMIC VIBRATOR

BACKGROUND

Technical Field

Embodiments of the subject matter disclosed herein generally relate to seismic data acquisition methods and systems and, more particularly, to mechanisms and techniques for strengthening a baseplate of a seismic vibrator to prevent its failure in the field.

Discussion of the Background

Seismic data acquisition and processing generate a profile (image) of subterranean geophysical structures. While this profile does not provide an accurate location of oil and gas reservoirs, it suggests, to those trained in the field, the presence or absence of these reservoirs. Thus, providing a high-resolution image of the geophysical structures is an ongoing process.

To obtain a high-resolution image of the underground, a seismic survey system employs a seismic source that generates seismic waves, and seismic receivers that record seismic signals associated with the seismic waves. The seismic source imparts energy to the ground. The energy travels through the subsurface and gets reflected from certain subsurface geological formations, e.g., boundaries or layers. The reflected energy travels back to the surface, where the seismic receivers record it. The recorded data is processed to yield information about the location and physical properties of the layers making up the subsurface.

For land explorations, the seismic source may be a vibratory source. The energy transmitted by the vibratory source to the ground is proportional with the force acting on it. For land seismic surveys, it is desirable to transmit as much energy as possible to the ground. Thus, the heavier the truck carrying the vibratory source, the more weight is available to keep the baseplate in contact with the earth, enabling larger actuators to be used to drive the baseplate to transmit more vibratory energy into the earth.

Large hydraulic vibrators mounted on vehicle carriers equipped with tires or tracks are commonly used for geophysical exploration. Typically, a vehicle carrier 100, as illustrated in FIG. 1, moves to a pre-determined shot point 102. The carrier 100 uses a lift system 116 to lower a baseplate 118 that couples vibratory energy into the earth 120. A static hold-down force is also applied to the baseplate to preload it, using a portion of the vehicle weight so that during a sweep, the baseplate remains in good contact with the earth. The vibrator mechanism 122 then generates a sweep that typically lasts for 8 to 16 s, but in some cases may be shorter or last up to 60 s, to produce a seismic signal 124 useful for illuminating subterranean features 126.

After the sweep is completed, the baseplate is raised, the vehicle moves up to the next shot point and the process repeats. During a typical day of seismic acquisition, the vibrator spends a large time hammering the baseplate to transmit the energy to the earth.

Large land vibrators in common use today are capable of full energy output over the range of about 7-90 Hz. Outside this band, the maximum deliverable vibratory force (ground force) is limited due to constraints imposed by limiting factors in the mechanical and/or hydraulic system. To generate this energy, the vibrator mechanism 122 generates an up and down movement, which is mechanically transmitted to the baseplate 118. These up and down movements can become very intense for low frequencies and a large amount of energy is transferred to the baseplate in a rough manner. This energy transfer from the vibrator mechanism to the baseplate, for certain frequencies, can be described as an act of "hammering" the baseplate.

The baseplate 118 is typically made of one large, single, slab 200 (see FIG. 2) of metal or composite material (see, for example, U.S. Pat. No. 4,253,538 or 8,913,465) that is perfectly flat and smooth, and this slab is configured to directly contact the ground 202. The slab 200 is attached to a support structure 210, which has ribs or another similar structure, for preventing the deformation of the slab 200. Then, an energy transfer mechanism 212 (only partially shown in FIG. 2) contacts the support structure 210 and transfers the energy from the vibratory mechanism 122 shown in FIG. 1. The single slab 200 is attached to the support structure 210 by welding, with bolts, or other known mechanisms.

Due to the large force applied by the energy transfer mechanism 212 to the support structure 210, and due to the large surface area of the single slab 200 (for example, in the order of 0.5 to 1 $m^2$), the single slab may partially get damaged (for example, it may partially detach from the support structure) and makes the entire vibrator truck unusable.

This short life-time of the single slab of a baseplate for a vibrator truck negatively affects not only the cost associated with maintaining the source (replacing the baseplate), but also the cost of the entire seismic survey, as the entire seismic survey needs to be stopped when the source is damaged. Thus, there is a need for developing a seismic vibratory source that overcomes the problems mentioned above with regard to the baseplate.

SUMMARY

According to an embodiment, there is a vibratory source for generating seismic signals. The vibratory source includes a baseplate and a lift and hydraulic actuator system configured to actuate the baseplate to impart seismic waves into the ground. The baseplate includes plural individual plates for contacting the ground.

According to another embodiment, there is a baseplate for a vibratory source for generating seismic signals, and the baseplate includes a support structure and plural individual plates that are directly connected to the support structure. The plural individual plates are configured to directly contact the ground.

According to still another embodiment, there is a method of making a baseplate for a vibratory seismic source. The method includes welding together plural support members to form a support structure, and welding to each support member a corresponding individual plate. The individual plate is configured to directly contact the ground.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source mounted on a truck. However, the embodiments to be discussed next are not limited to this system, but may be applied to any vibratory source used to generate seismic waves, even if not mounted on a truck.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a seismic source that includes a vibratory mechanism that applies a given force to a baseplate, and the baseplate is configured to having plural individual plates instead of a single slab. Each single plate is attached to a corresponding structural member (e.g., beam or tube or similar structure) and the structural members are attached to each other. A gap formed by one or more structural members with a given plane is filled by the corresponding individual plate. The structural members are attached to each other and each individual plate is attached to a corresponding structural member. In this way, there is no gap formed between a given structural member and a corresponding individual plate, which reduces the probability of cracks being formed into the baseplate.

Figure 1:
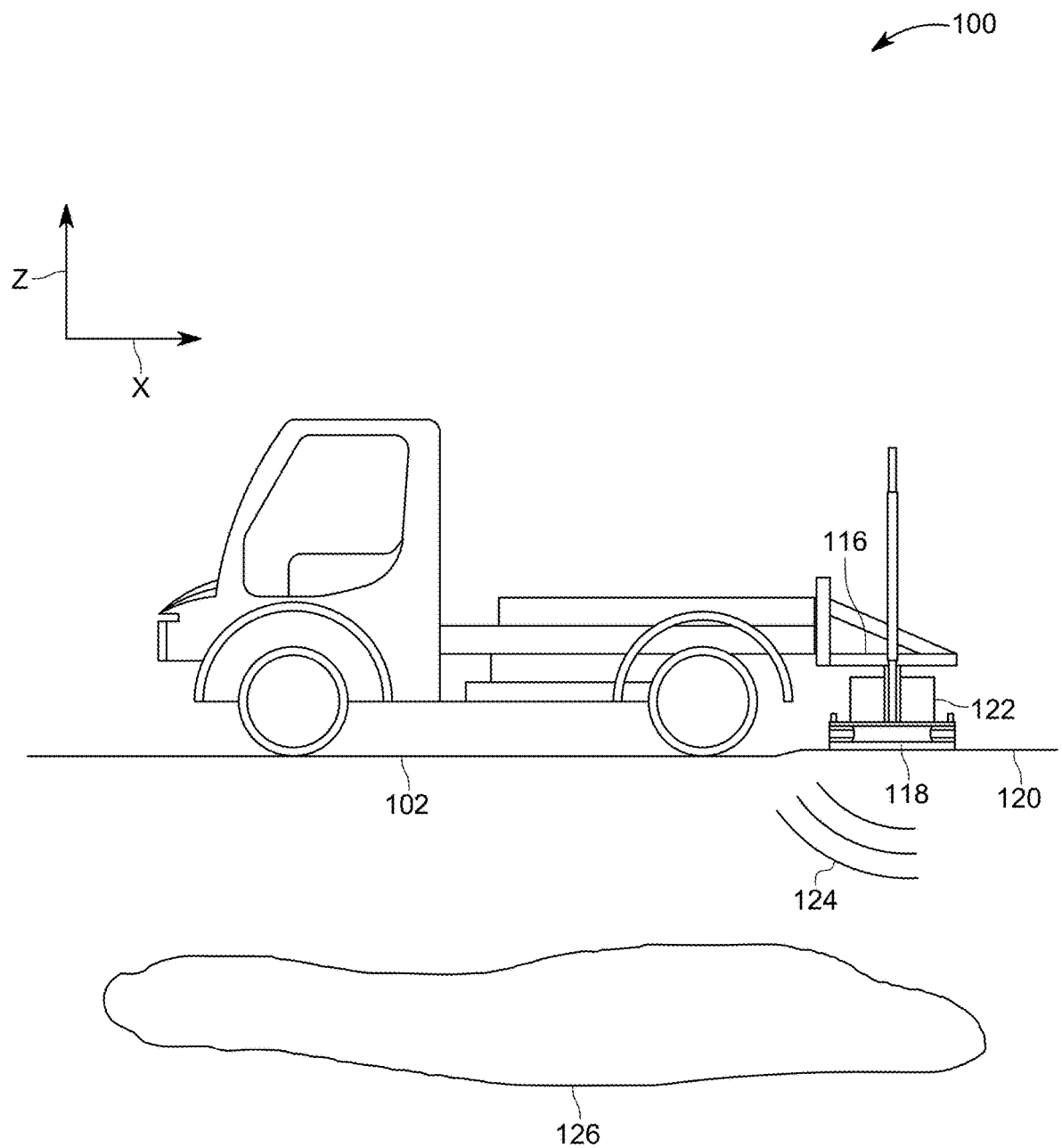
FIG. 1 is a schematic diagram of a truck-mounted vibratory source.
Figure 2:
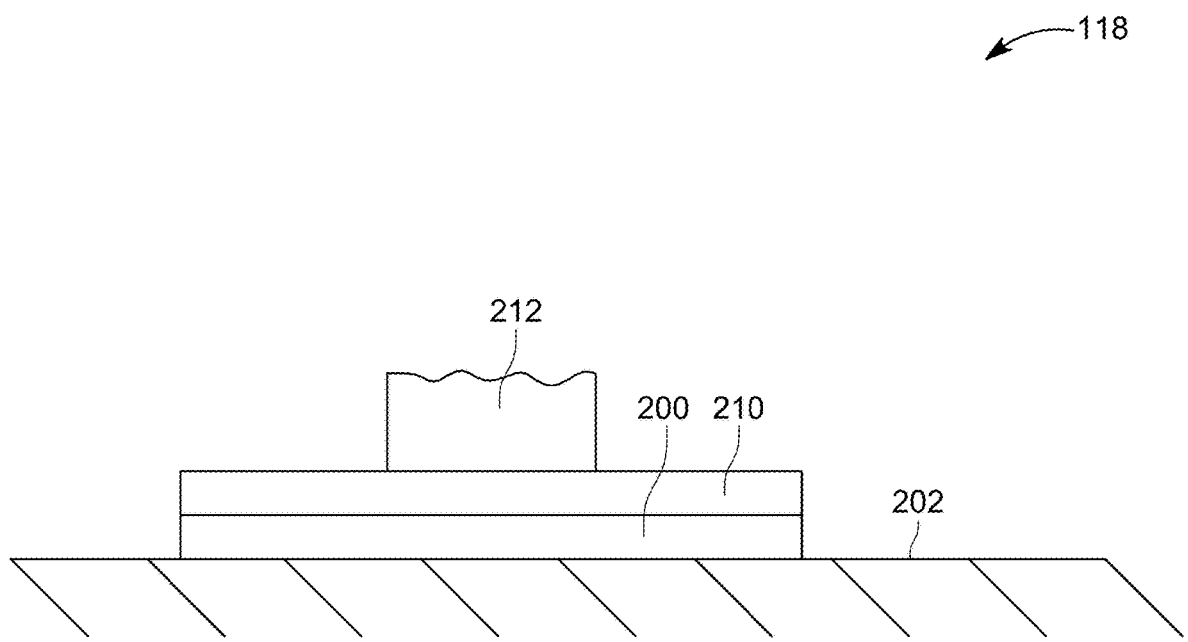
FIG. 2 is a schematic diagram of a baseplate of a truck-mounted vibratory source.
Figure 3:
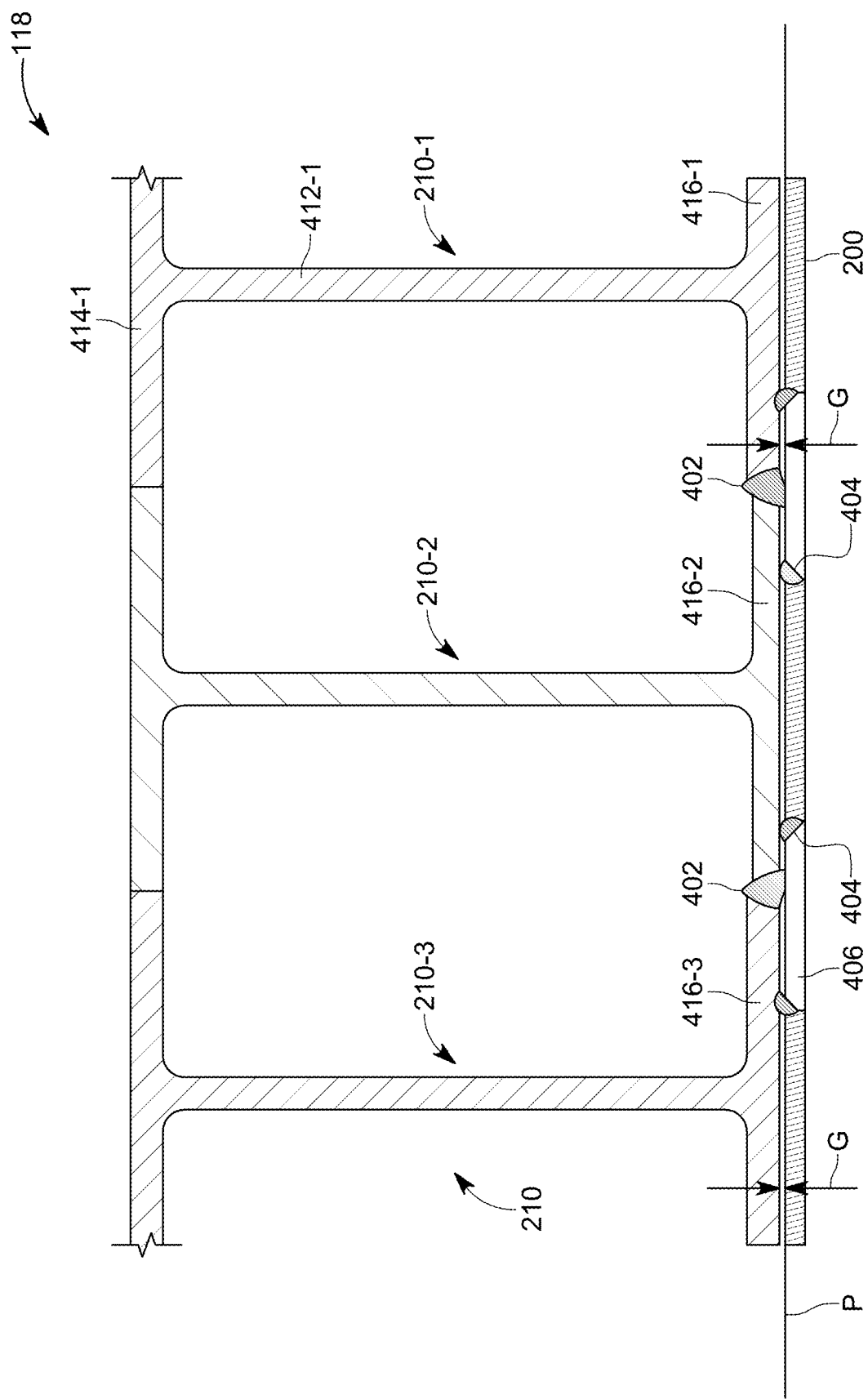
FIG. 3 illustrates a cross-section of the structure of a baseplate having a single slab facing the ground.

This novel baseplate is now discussed in more detail with reference to the figures. To better appreciate the advantages of the novel baseplate, FIG. 3 shows a baseplate 118 having the support structure 210 and the single large slab 200. For simplicity, the support structure 210 is shown having only three members 210-1 to 210-3, but an actual support structure has many of these members. In this figure, the member 210-1 is an H-beam having a web 412-1, a top flange 414-1, and a bottom flange 416-1. Each member 210-1 to 210-3 is welded at weld points 402 to each other. Then, the single large slab 200 is welded at welding points 404 to the plural bottom flanges of the members 210-1 to 210-3. Note that holes or slots 406 are needed to be formed in the single large slab 200 for being able to weld the slab 200 to the individual bottom flanges.

Figure 4:
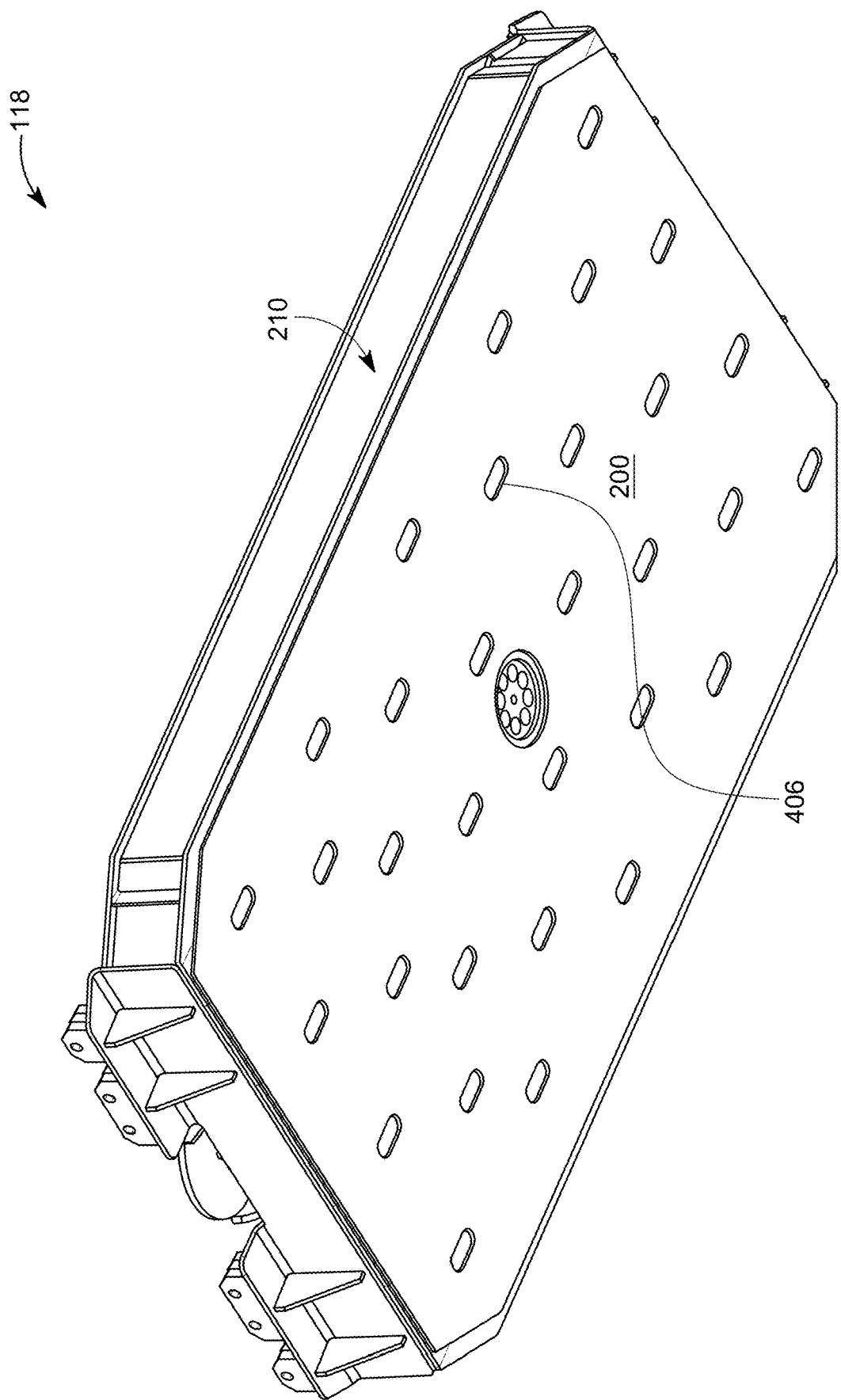
FIG. 4 is an overview of the baseplate having the single slab.

The members 210-1 to 210-3 are welded together so that the bottom flanges 416-1 to 416-3 are aligned to a given plane P. However, in practice, that is not possible, and as illustrated in FIG. 3, some bottom flanges will be aligned with the plane P, for example, bottom flange 416-2, but others will not, for example, bottom flanges 416-1 and 416-3 make a small gap G with the plane P. These gaps could be source of cracks in the slab 200. FIG. 4 shows an overview of the baseplate 118, the single slab 200, the holes or slots 406, and the support structure 210.

Figure 5:
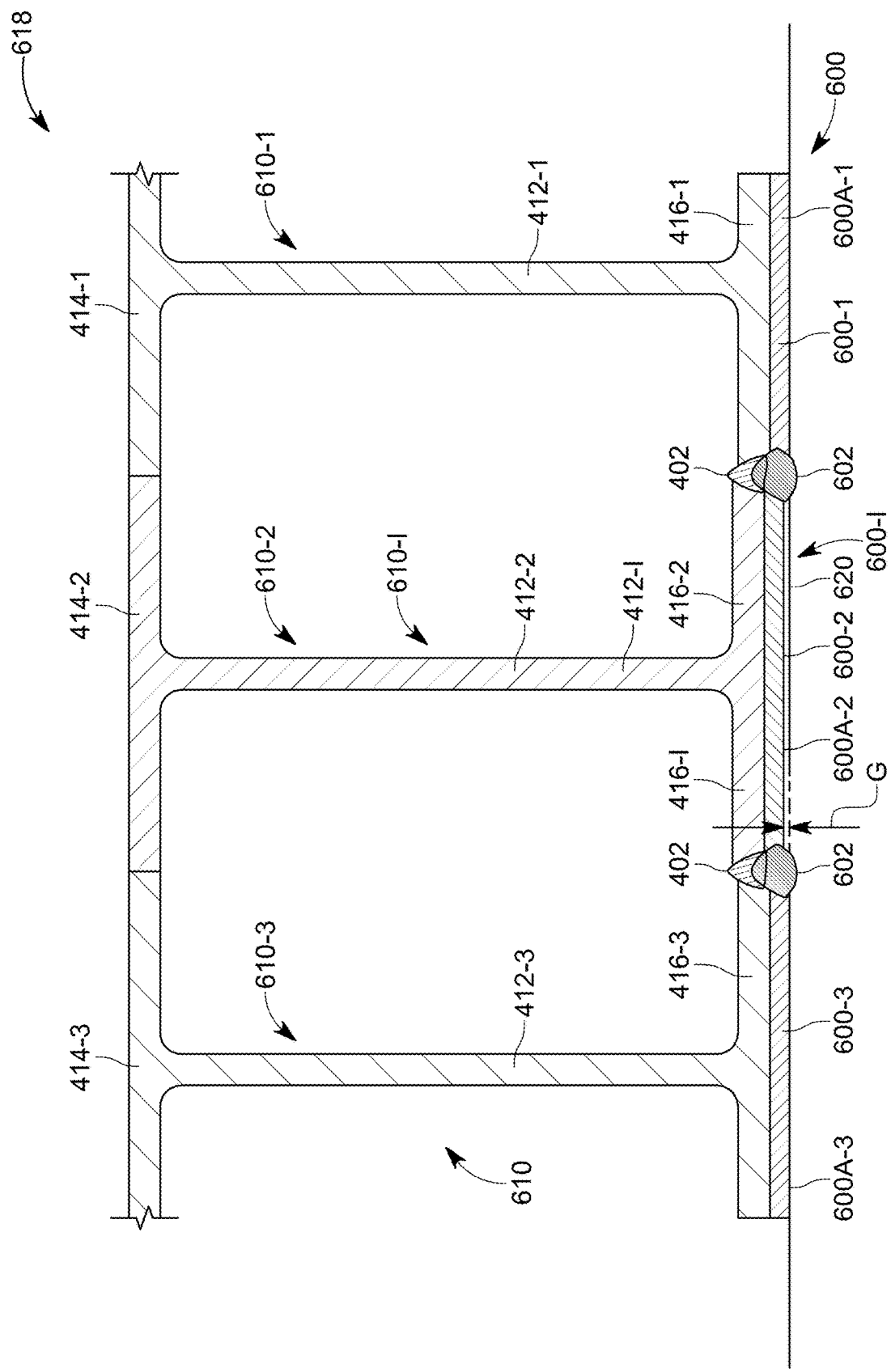
FIG. 5 is a cross-view of a structure of a baseplate having plural support members attached to corresponding plural individual plates.

According to the embodiment illustrated in FIG. 5, instead of having a single large slab 200, plural individual plates 600-1 to 600-3 form the slab 600. Although FIG. 5 shows only three individual plates 600-1 to 600-3, the number of the individual plates can be in the tens or hundreds, depending on the overall size of the support structure 610. In one embodiment, the number of individual plates is the same as the number of the members of the support structure 610. For example, for three support members 610-1 to 610-3, there are three individual plates 600-1 to 600-3, each individual plate being attached to a corresponding support member. The plural individual plates 600-I (where I is an integer larger equal to or larger than 2) and the support members 610-I form the baseplate 618.

According to this embodiment, each individual plate 600-I is attached to a corresponding bottom flange 416-I of a member 610-I, as shown in FIG. 5. FIG. 5 assumes that the member 610-I is an H-beam. However, the member 610-I may be a cylinder or may have other shapes with the same effects. The individual plate 600-I is attached at welding points 602 to the corresponding bottom flange 416-I. In the embodiment illustrated in this figure, the location of the welding points 602, between the individual plate 600-I and the corresponding support member 610-I, coincides with the location of the welding points 402, between adjacent support members 610-I.

Figure 6:
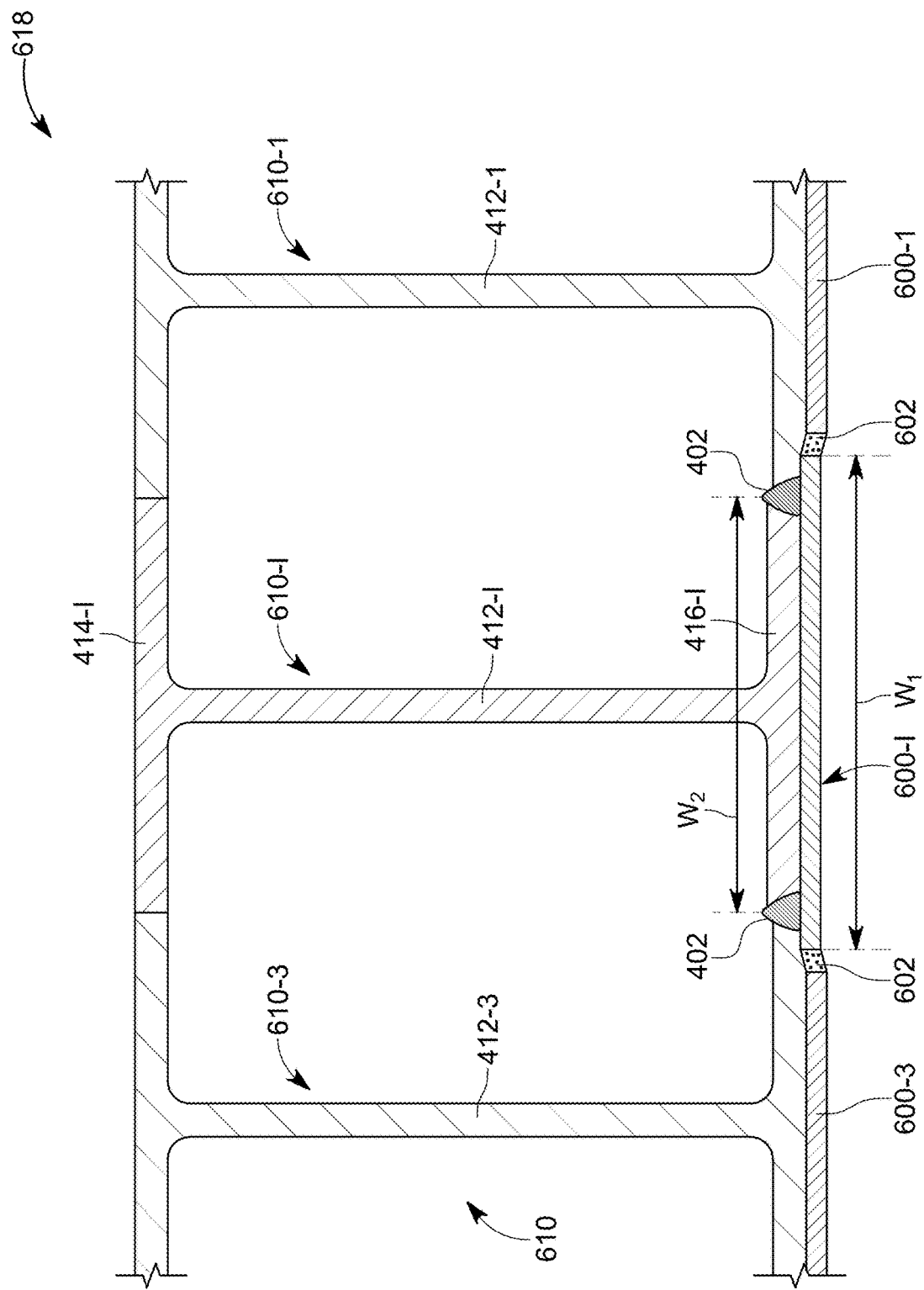
FIG. 6 is a cross-view of a structure of another baseplate having plural support members attached to corresponding plural individual plates.
Figure 7:
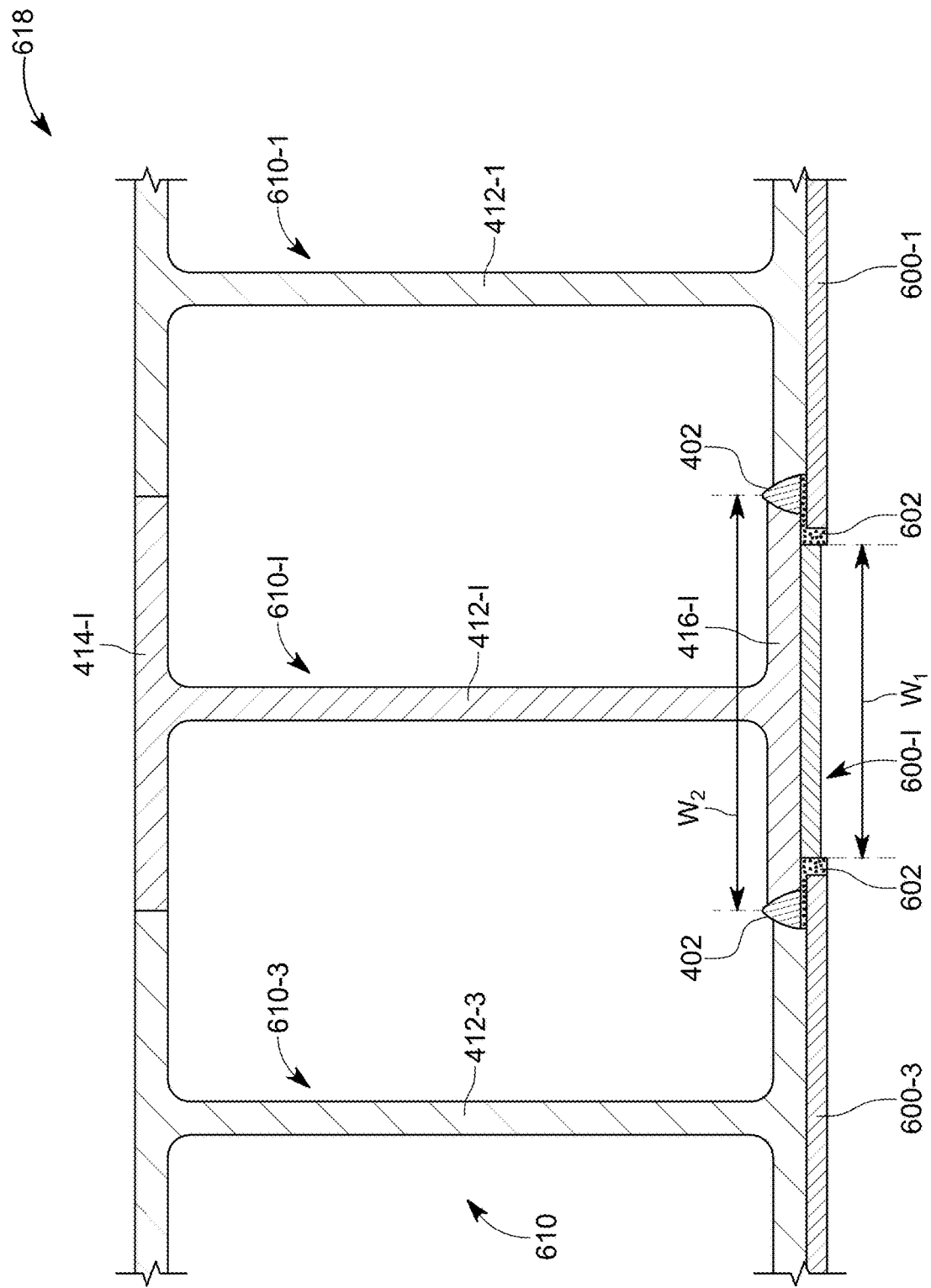
FIG. 7 is a cross-view of a structure of a still another baseplate having plural support members attached to corresponding plural individual plates.
Figure 8:
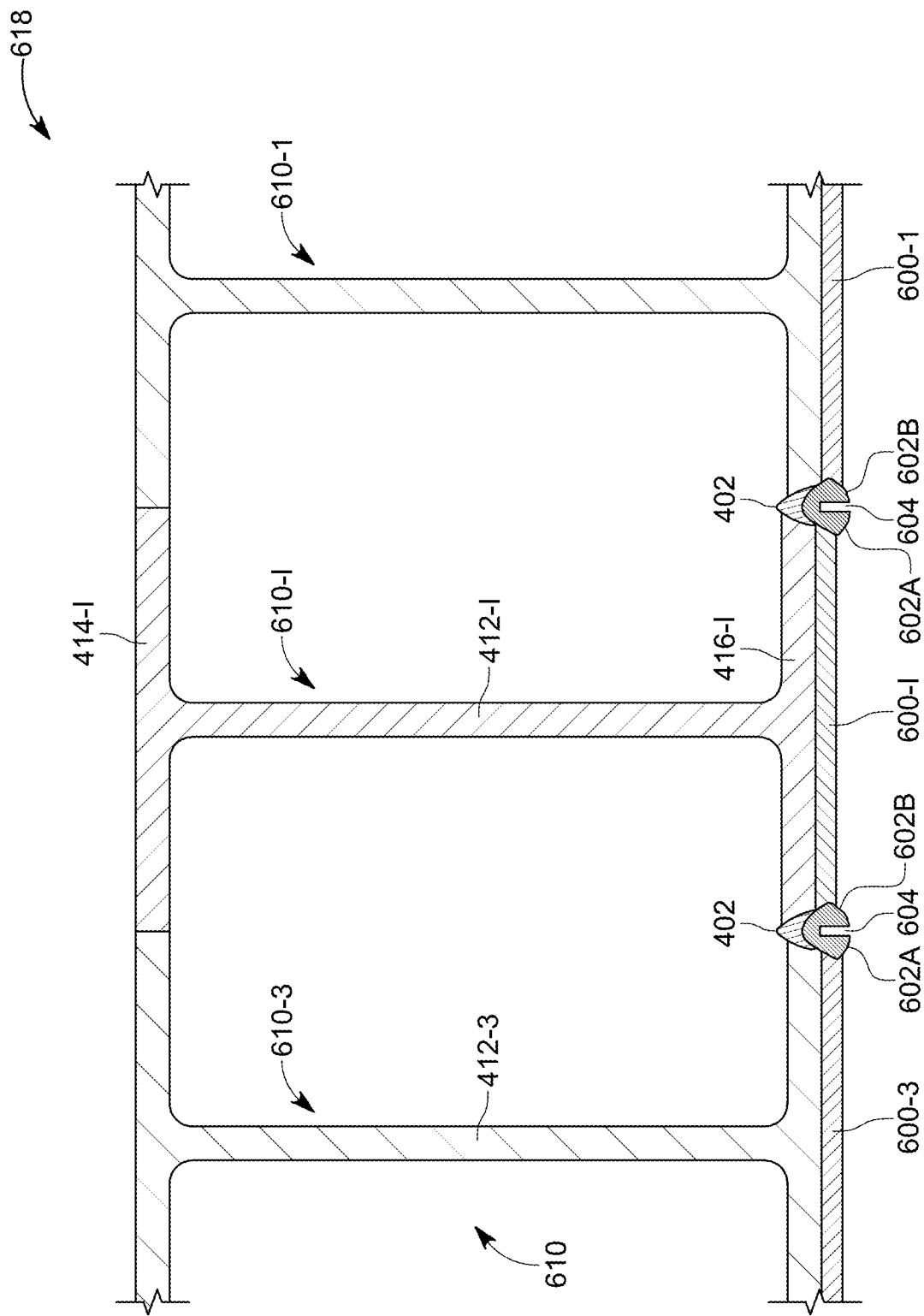
FIG. 8 is a cross-view of a structure of yet another baseplate having plural support members attached to corresponding plural individual plates.
Figure 9:
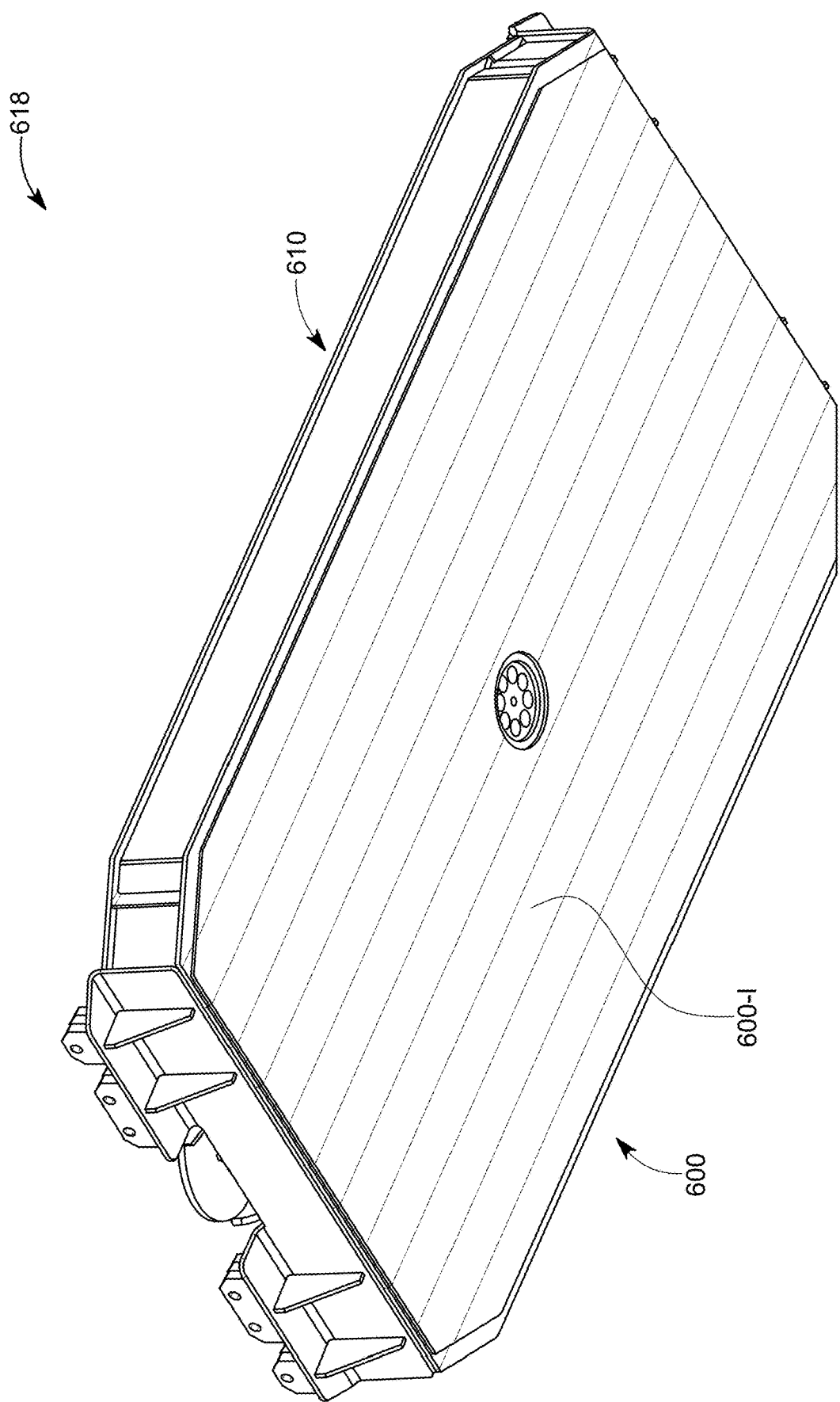
FIG. 9 is an overview of a baseplate having plural support members attached to corresponding plural individual plates.

However, in another embodiment, as illustrated in FIG. 6, it is possible to manufacture the individual plate 600-I to have a width W1 larger (by a couple of mm up to a few cm) than a width W2 of the bottom flange 416-I. In another embodiment, as shown in FIG. 7, the width W1 of the individual plate 600-I is smaller (by a couple of mm up to a few cm) than the width W2 of the bottom flange 416-I. In still another embodiment, as shown in FIG. 8, the widths of the individual plates 600-I are smaller than the widths of the corresponding bottom flanges 416-I, and thus corresponding grooves 604 are formed between the adjacent individual plates. FIG. 8 also shows that each individual plate 600-I is attached to a corresponding bottom flange 416-I with corresponding welding points 602A and 602B, that are not shared by the adjacent individual plates 600-1 and 600-3, i.e., the grooves 604 extend between the welding points. The embodiments illustrated in FIGS. 5-8 do not need any hole or slot to be formed in the individual plates for welding these individual plates to the corresponding support members. In other words, different from the traditional baseplate 118, which is illustrated in FIG. 4, the novel baseplate 618 has plural individual plates 600-I, either welded to each other or just welded to corresponding support members, and no holes or slots, as illustrated in FIG. 9.

Returning to FIG. 5, it is noted that the uneven alignment of the bottom flanges 416-I is "transmitted" to the plural individual plates 600-I, so that the gap G shown in FIG. 3 for the traditional baseplate 118, is now exhibited not between the support members 412-I and the corresponding plates 600-I, but rather between the various individual plates 600-I of the novel baseplate 618 and the ground 620. However, the location of the gap G, at the exterior surfaces of the individual plates 600-I, is not detrimental to the baseplate 618 because the exterior surfaces 600A-1 to 600A-3 come in contact with the ground 620, when deployed in the field, which is never perfectly flat. In addition, the ground 620 is soft enough so that the gap G between the various external surfaces 600A-1 to 600A-3 is easily "absorbed" by the ground. However, the embodiment shown in FIG. 5 exhibits no gap between the bottom flanges 416-I and the internal surfaces of the plural individual plates 600-I.

Each individual plate 600-I can be attached to the corresponding support member 412-I by welding. In one embodiment, the individual plates are attached to the support members by submerged arc welding. The submerged arc welding is known in the art and its characteristics are not repeated herein. However, if two of the adjoint individual plates 600-1 and 600-2 are in contact with each other, they will be attached to the corresponding bottom flanges with a square groove weld having a gap of zero (as in FIG. 5), and if the adjoint individual plates are separated by a given distance, for example, about 5 mm, they are welded to the corresponding bottom flanges with a fillet weld (as in FIG. 8).

Figure 10:
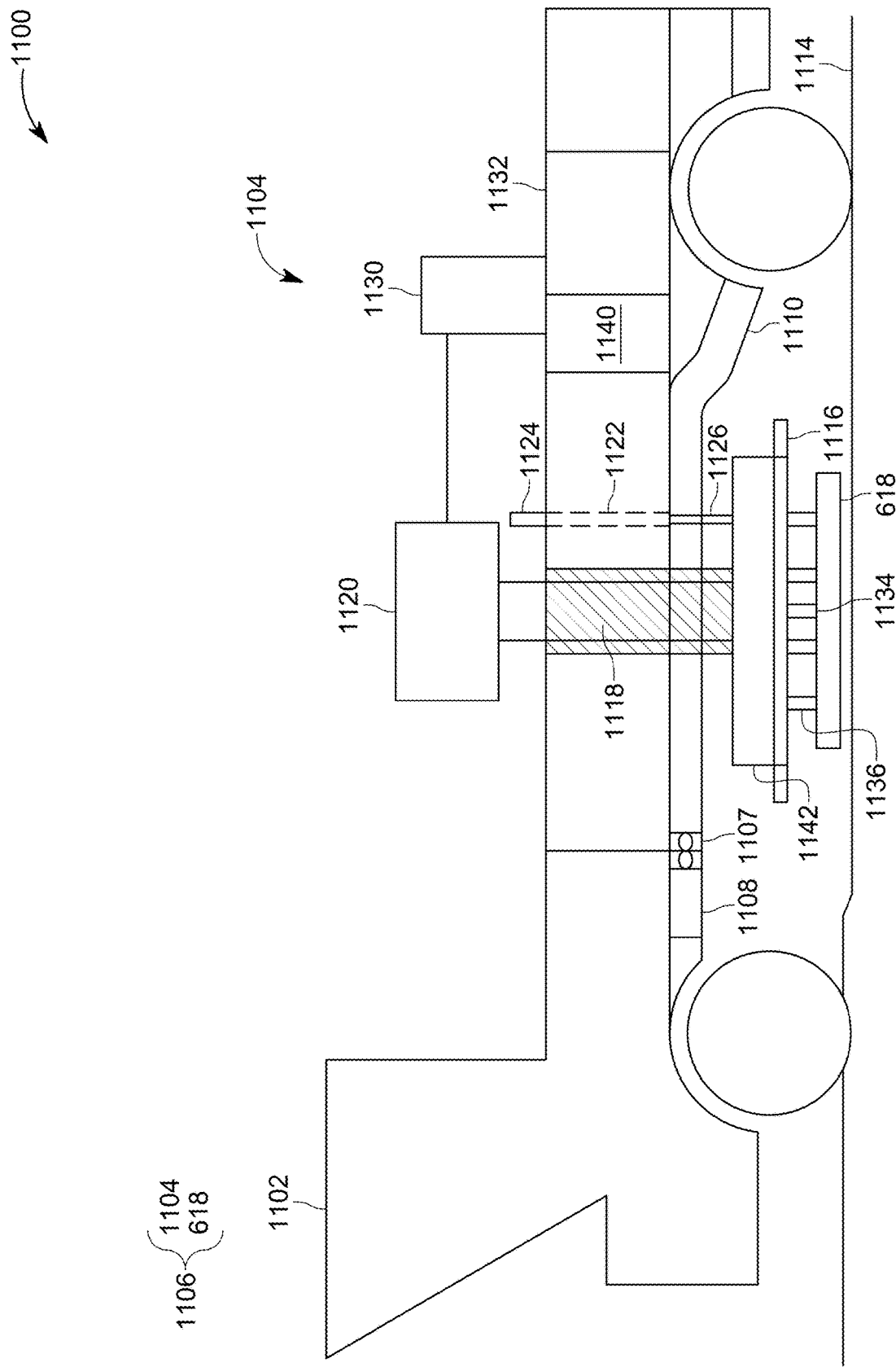
FIG. 10 illustrates a truck that carries a vibratory source having a baseplate that includes plural support members attached to corresponding plural individual plates.

FIG. 10 shows the implementation of the novel baseplate discussed above into a hydraulic seismic vibrator 1100. Hydraulic seismic vibrator 1100 (simply called "source assembly" herein) includes a carrier 1102 (e.g., a truck), a lift and hydraulic actuator system 1104 mounted on the carrier, and the baseplate 618, which is attached to the lift and hydraulic actuator system 1104. The lift and hydraulic actuator system 1104 and the baseplate 618 are called herein the "source" or "vibratory source" 1106. The carrier 1102 is shown to have an articulated frame, i.e., a rotatable articulation 1107 that connects the front frame 1108 to the back frame 1110 of the carrier. Other configurations for the frame of the carrier 1102 may be used.

The source assembly may have a rated output of about 276 kN, with a reaction mass of 4,082 kg and a driven structure mass (baseplate assembly) of 1,560 kg. The gross source assembly mass may be about 31,500 kg. These numbers are provided not to limit the applicability of the invention, but rather to give the reader a sense of the force that is applied to the baseplate. The carrier shown in FIG. 10 is a wheeled vehicle, but the invention also applies to carriers equipped with tracks that are even heavier. In this case, the vibrator baseplate 618 is not yet in contact with the ground 1114.

The lift and hydraulic actuator system 1104 includes a foot piece 1116, a pair of guide columns 1118 (only one shown in the figure), cross member 1120 and hydraulic ram actuator 1122. Hydraulic ram actuator 1122 includes lift cylinder 1124, which is attached to the vehicle frame 1110, and lift rod 1126. One end of lift rod 1126 is attached to foot piece 1116, and the other end enters lift cylinder 1124. FIG. 10 also shows a hydraulic lift valve 1130, which upon receiving a command from a controller 1132 operated by the operator, directs flow in and out of the lift cylinders to raise and lower the baseplate. The foot piece 1116 is connected non-rigidly to baseplate 618 through a system of airbag isolators 1134 and through some chains 1136.

After vehicle 1102 has moved to its assigned shot point, upon command from controller 1132, lift valve 1130 directs hydraulic fluid into the lift cylinders 1124, and a force is transmitted to foot piece 1116 through lift rods 1126. Before contacting ground 1114, chains 1136 are under tension and carry the weight of the baseplate 618 as it is lowered. Guide columns 1118 in conjunction with cross member 1120 help to synchronize the action of lift cylinders 1124 as well as stabilize the vehicle and vibrator assembly, which is important when operating on non-even surfaces.

Once baseplate 618 contacts the ground, the airbags 1134 are compressed due to a portion of the vehicle carrier weight being applied as a hold down force through the lift rods 1126 to the foot piece 1116. The applied hold down force is predetermined by a setting of a pressure regulator valve that controls the pressure applied to the lift cylinder 1124. Once the desired hold-down force has been reached, lift valve 1130, which is a pressure-regulated valve, and chains 1136 are slack, and the vehicle frame 1110 is vibration-isolated from the baseplate 618 and the driven structure. During a sweep, the carrier is typically vibration-isolated from the baseplate for frequencies above about 2 Hz.

During a sweep, a servo-valve (not shown) directs high-pressure fluid into internal chambers of the reaction mass 1142. The reaction mass bore is configured to act like a double-acting hydraulic cylinder. A sweep is typically a swept frequency sine-wave signal, but other wave shapes are sometimes used. Upon receiving a start command, the vibrator controller 1132 creates a drive signal to control the servo-valve. As the servo-valve directs fluid into the reaction mass's upper and lower chambers (not shown), a dynamic force is applied to a hydraulic piston (not shown) that rides inside the reaction mass bore. That piston is rigidly connected to baseplate 618 through piston rod 1126 and other structure. Piston rod 1126, baseplate 618 and rigidly attached structures are referred to as the driven structure. As the piston accelerates up and down during the sweep, a reaction force is directed to the driven structure. Since baseplate 618 is in direct contact with the ground 1114, seismic energy is radiated into the ground. However, as each support member of the baseplate 618 is individually connected only to a corresponding individual plate, as illustrated in FIG. 5, the chance of faults appearing in the individual plates is greatly reduced when compared to the traditional baseplates that have a single large slab covering the entire baseplate. When the sweep is complete, the lift process is reversed and baseplate 618 is raised, and the source assembly is ready to move to another location.

Figure 11:
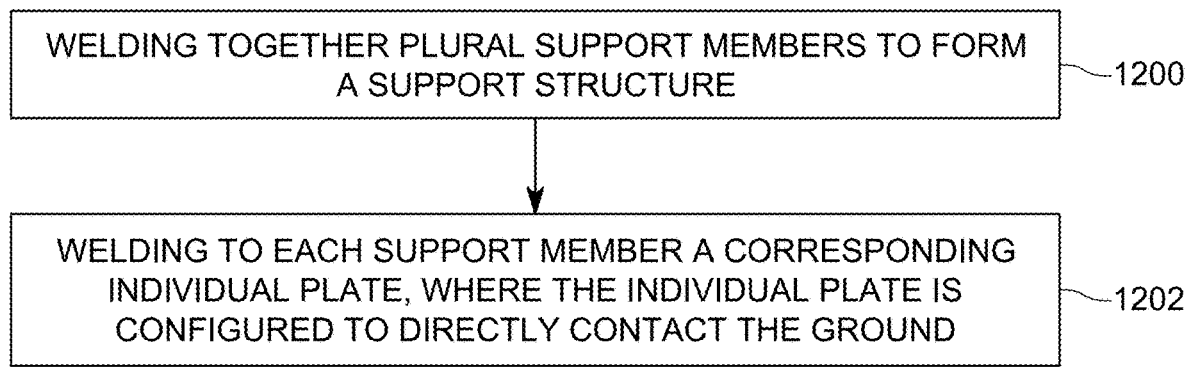
FIG. 11 is a flowchart of a method for making a baseplate that has plural support members attached to corresponding plural individual plates.

A method of making the baseplate 618 is now discussed with regard to FIG. 11. The method includes a step 1200 of welding together plural support members 610-I to form a support structure 610, and a step 1202 of welding to each support member 610-I a corresponding individual plate 600-I, where the individual plate (600-I) is configured to directly contact the ground. In one application, each individual plate is attached by submerged arc welding to a corresponding support member. Welding points between the plural support members of the support structures are aligned to welding points between the plural individual plates.

The disclosed embodiments provide a source and baseplate that have plural individual plates aligned to corresponding plural support members to prevent a separation of the plates from the support members. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A vibratory source for generating seismic signals, the vibratory source comprising:
   a baseplate; and
   a lift and hydraulic actuator system configured to actuate the baseplate to impart seismic waves into the ground,
   wherein the baseplate includes plural individual plates for contacting the ground, each of the individual plates being welded to at least another of the individual plates.

2. The vibratory source of claim 1, wherein the baseplate further includes:
   a support structure that is directly connected to the plural individual plates.

3. The vibratory source of claim 2, wherein the support structure includes plural support members, each support member corresponding to a single individual plate of the plural individual plates.

4. The vibratory source of claim 3, wherein each individual plate of the plural individual plates is attached by submerged arc welding to a corresponding support member.

5. The vibratory source of claim 3, wherein welding points between the plural support members of the support structures are aligned to welding points between the plural individual plates.

6. The vibratory source of claim 3, wherein welding points between the plural support members of the support structures are closer than welding points between the plural individual plates.

7. The vibratory source of claim 3, wherein welding points between the plural support members of the support structures are farther than welding points between the plural individual plates.

8. The vibratory source of claim 3, wherein there is a groove between adjacent individual plates of the plural individual plates.

9. The vibratory source of claim 3, wherein there is no space between adjacent individual plates of the plural individual plates.

10. The vibratory source of claim 1, wherein there is no hole into any of the plural individual plates.

11. The vibratory source of claim 3, wherein each of the plural individual plates is submerged arc welded to a corresponding support member.

12. The vibratory source of claim 3, wherein the plural support members are H-beams, and outside faces of the plural individual plates are not aligned in a given plane.

13. A baseplate for a vibratory source for generating seismic signals, the baseplate comprising:
    a support structure; and
    plural individual plates that are directly connected to the support structure and each one of the individual plates is welded to at least another one of the individual plates,
    wherein the plural individual plates are configured to directly contact the ground.

14. The baseplate of claim 13, wherein the support structure includes plural support members, each support member corresponding to a single individual plate of the plural individual plates.

15. The baseplate of claim 14, wherein each individual plate of the plural individual plates is attached by submerged arc welding to a corresponding support member, and welding points between the plural support members of the support structures are aligned to welding points between the plural individual plates.

16. The baseplate of claim 14, wherein the plural support members are H-beams, and outside faces of the plural individual plates are not located in a same plane.

17. The baseplate of claim 14, wherein the plural support members are not located in a same plane.

18. A method of making a baseplate for a vibratory seismic source, the method comprising:
    welding together plural support members to form a support structure;
    welding to each support member a corresponding individual plate, wherein the individual plate is configured to directly contact the ground; and
    welding each individual plate to at least another individual plate.

19. The method of claim 18, wherein each individual plate is attached by submerged arc welding to a corresponding support member.

20. The method of claim 18, wherein welding points between the plural support members of the support structures are aligned to welding points between the plural individual plates.

* * * * *